United States Patent [19]
Ash

[11] 4,315,342
[45] Feb. 16, 1982

[54] CAR WASHING IMPLEMENT

[76] Inventor: Earl M. Ash, 2498 Dalesford Dr., Troy, Mich. 48098

[21] Appl. No.: 121,264

[22] Filed: Feb. 13, 1980

[51] Int. Cl.³ .................. B05C 17/00; A47L 1/15; B50S 3/04
[52] U.S. Cl. .................. 15/121; 15/210 R; 15/244 R
[58] Field of Search ............ 15/118, 121, 208, 209 R, 15/210 R, 244 R, 244 A, 244 B, 228; 401/54, 88, 89, 196, 200, 201, 267

[56] References Cited
U.S. PATENT DOCUMENTS

| | | | |
|---|---|---|---|
| 1,397,611 | 11/1921 | Bailey | 401/201 |
| 1,685,265 | 9/1928 | Barber | 15/118 |
| 2,601,689 | 7/1952 | Mallard | 15/244 R X |
| 3,369,268 | 2/1968 | Burns et al. | 15/210 R |
| 3,388,415 | 6/1968 | Warner et al. | 15/210 R X |
| 3,402,009 | 9/1968 | Sawyer | 15/244 R X |
| 3,428,405 | 2/1969 | Posner | 401/201 |
| 3,629,894 | 12/1971 | Stefany | 15/210 R |
| 4,127,911 | 12/1978 | Cupp et al. | 15/210 R |

*Primary Examiner*—Edward L. Roberts
*Attorney, Agent, or Firm*—Dale A. Winnie

[57] ABSTRACT

A car washing means and method which includes; a paint-pad type holder and handle member having means for receiving and holding and pad member engaged there to, a pad member made and sized for use with the holder and handle member, and said pad member having a soft pliable sponge-like body portion, saturable with wash water upon being immersed in a pail thereof, with a more durable covering on the face and back edge thereof and including cut fibrous ends for longer lasting wash-wear life use thereof. And a wiper blade member provided on the holder for subsequent convenience and use.

2 Claims, 3 Drawing Figures

CAR WASHING IMPLEMENT

BACKGROUND OF THE INVENTION

Numerous means and methods have been used before, and taught, on how to manually wash a car.

These have included various attachments to the garden hose, wash mits, sponges and the like. And they have usually required that the car, or other vehicle that is being washed, be rinsed down after it is washed, and then wiped, to avoid soap or detergent films and water spotting.

Most people just do not have the time or ambition to go over their car three times, which is what is necessary to wash, rinse and wipe a car down, as most car washing systems require.

At the same time, most people do not like automatic car washes because they do not do a very thorough job, and because they are too expensive to use very often. And, unfortunately, it always seems there is more truth than fiction to the old adage that it always rains right after you wash your car.

The garden hose do-it-yourself methods, however, also have the advantage of using a lot of water and of getting everyone and everything pretty wet and disgruntled before the job is done.

Although dry-wash systems have been proposed, they usually require some special and costly liquid fluid composition that is squirted on the car and then has to be wiped around and off to clean the car. These usually take a lot of clean rags and elbow grease, and the person cleaning the car frequently ends up dirtier than the car was when he started.

What appears to be needed is some simplified system which uses water, since it is the most economical and readily available, but not in excess, since water sprays, puddles and wet feet are no pleasure either. Further, there should be some means for washing and rinsing, or rinsing and wiping, the car at the same time, to avoid some of the duplication of effort that has otherwise been required. And, lastly, the tool or implement that is used should be renewably reusable, for added economy and/or disposable use, for those that so desire.

SUMMARY OF THE INVENTION

This invention is directed to a new and different means and method for washing automotive and other vehicles and which may also have other wash, rinse and wipe uses.

It is proposed to make use of a paint pad type holder and handle member which provides a backing member that is somewhat broader than the span of a man's hand and has a convenient handle already provided thereon. And it is proposed to have a new and different type of washing and rinsing pad for replaceable use with such a holder and handle member.

In particular, the pad member is to be inclusive of a body portion of a sponge-like material of reasonable thickness, to hold wash and/or rinse water and to allow yielding conformity to surface ornamentation, as in washing a car. Further, and most important, is a soft fibrous covering on the face of the pad member, and its back edge, for wear-resistant protection of the soft sponge-like body material and more uniform wash and rinse water distribution for its intended purpose.

The wash pad covering is only on the face and back edges of the pad member to allow wash and rinse water to be squeezed out and to flow more readily through the front and side edges thereof.

And a wiper blade is provided on the holder and handle member for subsequent rinse water wiping use or as otherwise desired.

In practice, the holder, fitted with a washing pad as taught by this invention, is immersed in a pail of wash water and is used to manually wash a section of an automotive or other vehicle. If the car is not too dirty, and the wash water is not overly strong, a back and forth motion with the pad and a pass with the wiper blade is about all it takes. The wash pad is kept saturated by the sponge-like material and/or a little pressure will squeeze out some wash or rinse water, if needed.

A further and more detailed description will follow, in the course of describing the embodiment of the invention that is shown by the drawing figures.

THE DRAWING FIGURES

DETAILED DESCRIPTION OF ILLUSTRATED EMBODIMENT

Figure 1:
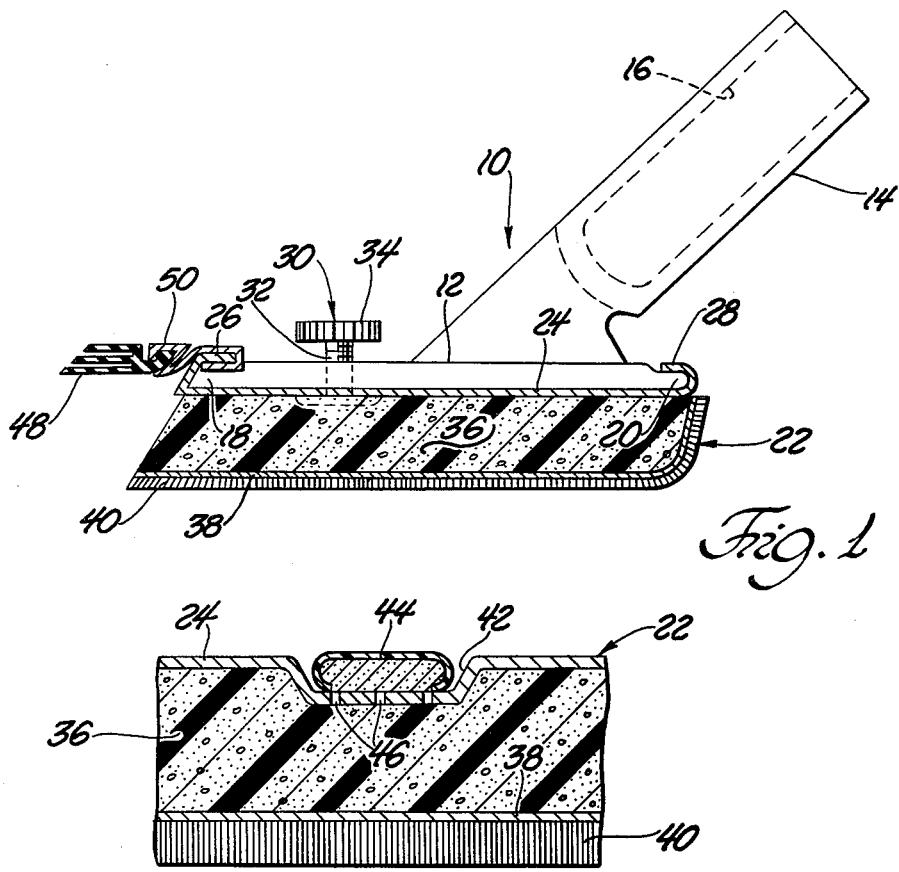
FIG. 1 is a side plan view of the paint pad type holder and handle, and washing pad member, proposed by this invention.

The paint pad type holder and handle member 10, shown in the first drawing figure is preferably of molded plastic, as is commonly known and used. It has a reasonably broad and expansive backing member part 12, somewhat larger than the open span of a man's hand, and a handle portion 14 which is hollow, as at 16, for an extension handle if and when needed.

The backing member or part of the holder is flat and formed at the front and back edges 18 and 20 respectively, to receive and retain the fastening edge of the washing pad 22 of the present invention.

The washing pad 22 includes a backing member of its own, identifited as 24, with front and back edges, 26 and 28 respectively, that are formed to fit over and slide along the receptive edges 18 and 20 of the holder part. This allows the washing pad member 22 to be replaceably assembled with the holder and handle member part 10 by having the two held relatively aligned, one side edge to the other and then slid together.

Fastener means 30, with a threaded shank 32 and an enlarged and suitable knurled head 34, may be used for threaded engagement with the backing member 24 on the washing pad or pressure point engagement through the holder and against the pad's backing member to hold the turned edges 26 and 28 more tightly fitted on the edges of the holder.

The washing pad 22 includes a main body portion 36, of a reasonable substantial thickness and which is of a sponge-like cellular construction and composition capable of yielding compression and expansion to absorb, take-up and hold wash or rinse water, when immersed therein. And it also includes a covering 38 over its whole and entire face, and its back edge, which is of a soft fibrous material, similar to that of a painting pad, and with the cut fibrous surface 40 disposed outwardly.

The wash pad covering material 38 does not extend around or cover the front or side edges of the washing pad 22. Rather, they are open and accordingly better able to have wash and/or rinse water squeezed and flushed through the front and side edges of the pad, when and as desired.

Figure 2:
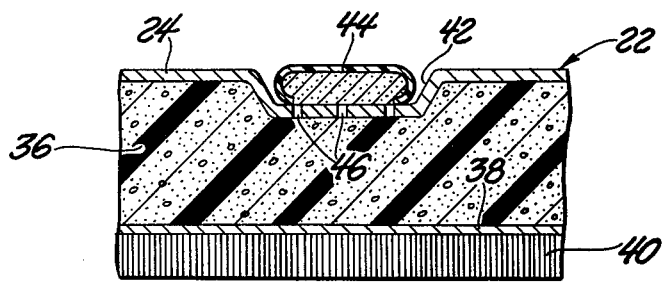
FIG. 2 is an enlarged cross-sectional view of a part of the washing pad to better show certain details of construction.

FIG. 2 shows another detail of interest and which has not been previously mentioned.

While the proposed holder and pad may be immersed in a bucket of wash water that has been pre-prepared, there may also be instances when getting the soap or detergent that is needed is not convenient or immediately possible. So, as a matter of convenience, principally, it is proposed to provide a depression 42, formed right in the back of the backing member 24 for the washing pad, and to have an encapsulated amount of soap or detergent, or an enlarged tablet of a suitable washing material, identified as 44, provided therewithin and which will dissolve and readily pass through openings 46 provided for such purpose, when immersed in a bucket or other large container of wash water.

One or more such encapsulated or otherwise packaged amounts of a washing concentrate may be so provided on the back of a washing pad to allow for flat packaging of the pad and to provide a self contained and usable washing pad that can be kept in the trunk of a car and ready for use whenever needed.

It is also conceivable and envisioned that the fastening screw 30, used to hold the washing pad on the holder, might be used to puncture or crumble the washing concentrate and make it available for use when the pad is installed on the handle and holder part.

Another feature, shown best in FIG. 1, is the wiper blade 48 and its holder 50 which is fastened to the front edge of the holder and handle member 10. The arrangement shown is fairly simple with the holder part of the wiper merely made for slip fitted engagement with the turned edge 26 of the backing member 24 on the washing pad.

Figure 3:
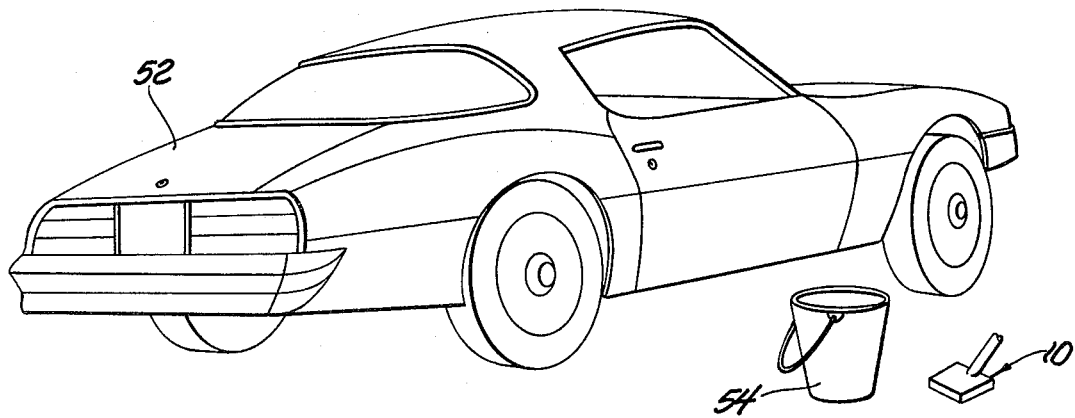
FIG. 3 is a perspective view of a car, a wash pail, and the car washing implement of the present invention.

Referring now to FIG. 3, an automotive vehicle 52 is shown and beside it is a pail 54 and the handle and holder member 10, with a washing pad that is made, constructed and assembled there to in accord with the teachings of the present invention.

The pail 54 is filled with water, preferably warmed somewhat, and the washing pad and holder are immersed therein.

The more economical washing pads, or ones that are being reused, will require that some soap or detergent be placed in the water in the pail, or that another capsule or tablet of concentrate be used with the washing implement. This assumes, also, that other than plain water is to be used in washing the car. In some instances when the car is merely dusty, or not too dirty, plain water is all that is needed.

Then, all that is required is to use the holder and handle part to stroke the washing pad back and forth across the car body, turn it over and use the wiper blade to wipe it dry and clean.

If the car is particularly dirty, two pails and two holder and pad devices may be used; one pail with wash water and the other with rinse water. Or one holder can be used alternately in two pails.

However, the simplicity of the car washing system that is afforded by use of the present invention will generally encourage more frequent and regular washing of the car, with less effort, and usually requiring only a plain water wash.

The advantage of the present invention is in having the wash water rag or sponge that was previously used provided with a convenient handle, having it covered and protected against wear and tear, yet still open at the sides and front for better rinse or wash water flow when needed, by pressing harder to squeeze it out, and in having a wiper blade on the same holder and under control of the same handle so that it's a simple flick of the wrist to flip it over and make use of it.

The sponge-like body part 36 enables the actual washing pad 38 to better assume the contours of body panel ridges and molding on the car, in addition to holding the wash or rinse water used. And the cut fiber surface 40 of the washing pad has a long lasting serviceable life, enabling the washing pads to be used over and over again. At the same time, they are inexpensive enough to be used once or twice and then thrown away.

I claim:

1. A car washing implement, comprising;
   a paint-pad type holder and handle member,
   a pad member sized for use with said holder and handle member and having a relatively fixed backing which is readily engaged to and disengaged from said holder and handle member for changing said pad member as and when desired,
   said pad member being of a water retenative cellular construction for wash and rinse water saturation, as emersed in a receptive bucket, and having a reasonably substantial thickness greater than needed or required for painting purposes and sufficient to allow for yielding conformity to ornamental and contoured auto body surfaces in the washing and distribution of rinse water thereover,
   said pad member having a face opposite said holder and a rear edge extending beyond said holder to provide a work contacting surface on said rear edge,
   a soft fibrous covering provided and disposed over the face and rear edge of said pad member for wear resistant and extended wash-life use of said pad member and to provide for more uniform wash and rinse water distribution therethrough in the use thereof,
   and a relatively free floating wiper blade having at least two wiping blade parts extending forwardly from said holder and handle member for rinse water wiping use as needed.

2. The car washing implement of claim 1,
   said pad member having only the face and back edge thereof inclusive of said soft fibrous covering for allowing wash and rinse water to be squeezed out and to flow more readily through the front and side edges thereof.

* * * * *